Patented Dec. 31, 1929

1,741,310

UNITED STATES PATENT OFFICE

ALPHONS O. JAEGER, OF CRAFTON, PENNSYLVANIA, ASSIGNOR TO THE SELDEN COMPANY, OF PITTSBURGH, PENNSYLVANIA, A CORPORATION OF DELAWARE

CONTACT SULPHURIC ACID PROCESS

No Drawing. Application filed July 3, 1928. Serial No. 290,280.

This invention relates to the catalytic oxidation of sulphur dioxide to sulphur trioxide by the so called contact sulphuric acid process.

According to the present invention sulphur dioxide is oxidized to sulphur trioxide in the presence of oxygen by passing it at an elevated temperature over a contact mass containing at least one base exchange body or its derivative which has been subjected to acid leaching. The term "base exchange body" includes all natural or artificial bodies, diluted or undiluted, which possess the powers of exchanging some of their bases for the bases of salt solutions, the reactions being reversible. The expression excludes ordinary salts which are capable of exchanging a basic radical in ordinary metathesis, which is not reversible.

Base exchange bodies may be divided into three main groups, namely, two component and multi-component zeolites, that is to say base exchange bodies containing silicon and non-silicious base exchange bodies. The two component zeolites are reaction products of a soluble silicate with one or more metallates or a soluble silicate with one or more salts the basic radicals of which are metals capable of entering into the non-exchangeable nucleus of the zeolite. Multi-component zeolites are the reaction products of at least one soluble silicate, at least one metallate and at least one salt, the basic radical of which is a metal capable of entering into the non-exchangeable nucleus of the zeolite. The non-silicious base exchange bodies are usually reaction products of one or more metallates with one or more metal salts, the metals being capable of entering into the non-exchangeable nucleus of the base exchange body.

The base exchange bodies may be undiluted or they may be diluted with various diluents, either catalytically inert, activating or catalytically active. Homogeneously diluted base exchange bodies form the preferred starting materials for contact masses to be used in the present invention, though the latter is in no sense limited thereto. In addition to the base exchange bodies themselves, diluted or undiluted derivatives which are the reaction products of the base exchange bodies with compounds containing acidic radicals capable of forming with the base exchange bodies salt like bodies, may be used as starting materials and are included in the present invention.

In producing contact masses of the present invention the base exchange bodies before or after incorporation with any other ingredients present in the final contact mass are subjected to leaching with acids, or acid compounds preferably dilute mineral acids or their acid salts such as acid alkali metal salts. This leaching effect usually first attacks the exchangeable bases of the base exchange bodies, and may be continued until part or all of the exchangeable bases are removed, leaving only the non-exchangeable nucleus. If the leaching is carried out still further the more basic portions of the non-exchangeable nucleus are gradually leached out, the final product in the case of zeolites being a complex silicic acid and in the case of non-silicious base exchange bodies being the more acidic portion of the non-exchangeable nucleus.

In order to define base exchange bodies and their salt like derivatives these bodies will be referred to as permutogenetic bodies, and the leached products which are used in the contact masses of the present invention will be referred to as leached permutogenetic bodies it being understood that these terms will have no other meaning in the present specification and claims. It should also be understood that when referring to metal salts in the specification and claims this expression is to include only such metal salts the basic radical of which is capable of forming part of the non-exchangeable nucleus of a base exchange body. Other metal salts, such as salts of the alkali forming metals, which cannot form part of the non-exchangeable nucleus of a base exchange body, are excluded.

Catalytically active components may be associated with diluted or undiluted permutogenetic bodies in four main forms, as follows:—(1) They may be physically admixed with or impregnated into the premutogenetic products. (2) They may be physically homogeneously incorporated into the permutogenetic products before the latter have been completely formed in the form of catalytically active diluent bodies or in the form of diluents which have been impregnated with catalytically active substances. (3) They may be chemically combined with or in the permutogenetic products in non-exchangeable form, that is to say, they may form a part of the non-exchangeable nucleus of the base exchange body present in the final contact mass or which is transformed into the derivatives, or they may be chemically combined with the base exchange bodies in the form of catalytically active anions which form with the base exchange body salt-like bodies. (4) They may be chemically combined in exchangeable form either during the formation of the base exchange body or by base exchange after formation. Obviously of course the same or different catalytically active components may be present in more than one of the above described forms, and it is an advantage of the present invention that catalytically active substances may be introduced in a wide variety of forms which gives a large field of choice to the catalytic chemist.

While the different permutogenetic products may vary widely in their chemical characteristics, they all possess a similar physical structure which is characterized by more or less high porosity, frequently microporosity, and great resistance to high temperatures, and in the case of products which have not been acid leached to the point of removal of catalytically active components these components are distributed throughout the frame-work of the products in atomic or molecular dispersion, as will be described in greater detail below, and this chemical homogeneity is one of the important advantages of some of the contact masses of the present invention.

While three of the methods of combination of the catalytically active substances may be effected with undiluted as well as diluted permutogenetic products, it has been found that homogeneously diluted permutogenetic contact masses are of advantage, particularly where the diluents are of a physical nature such as to exert a desired influence on the catalytic activity of the contact masses, as when, for example, diluents are rich in silica, which has been found to have an activating power, or where the diluents by reason of high porosity, capillarity, or surface energy may be considered as physical catalysts or activators.

Base exchange bodies used in contact masses of the present invention behave as if they were products of extremely high molecular weight for catalytically active components can be introduced either into the non-exchangeable nucleus or in the form of exchangeable bases in practically any desired proportions and the ordinary law of chemical combining proportions, which in compounds of low molecular weight restricts the proportions in which components can be incorporated chemically, appears to be without force, which makes it reasonable to assume that the molecular weight is so high as to completely mask the effect of the law. It is of course possible that the base exchange bodies, or some of them, may be solid solutions of a plurality of related compounds of lower molecular weight. It has not been possible hitherto to definitely settle this question, as base exchange bodies are not readily capable of structural chemical analysis. The present invention is of course not limited to any theory, but irrespective of the underlying reasons the fact that catalytically active components may be chemically introduced in any desired proportions is of enormous importance to the catalytic chemist and gives him the power to produce an almost unlimited number of finely and gradually toned catalysts or contact masses for the contact sulphuric acid process and in all cases the contact masses produced are highly effective by reason of the desirable physical structure of the permutogenetic products contained therein and the wide limits of homogeneous dilution of catalytically active molecules or atoms with resulting uniformity and smoothness of action.

In addition to the important characteristics with which permutogenetic products endow the contact masses of the present invention it has been found that it is frequently desirable to stabilize the contact masses, and this may be effected by associating with the permutogenetic products or incorporating or forming therein compounds of the alkali forming metals, that is to say, the alkali metals, the alkaline earth metals, and the strongly basic earth metals. These compounds appear to slow up or smooth out the catalytic reaction, and will be referred to throughout this specification as stabilizers. The stabilizers may be non-alkaline, weakly alkaline or strongly alkaline, depending on the nature of the catalytically active components used. It is a great advantage of the present invention that in the normal formation of base exchange bodies alkali forming metal oxides are present as exchangeable bases, and whether used without acid treatment or treated with acid, they form stabilizers which are combined in or associated with the resulting permutogenetic products in an extremely fine state of division in which the stabilizers are peculiarly active. Thus base exchange bodies containing alkali forming metal exchangeable bases may be considered as complex stabilizers.

In addition to the use of stabilizers, it has been found that the stabilizer action and the overall efficiency of the contact masses can in many cases be greatly increased or enhanced by the association therewith or chemical combination therein of elements or radicals or groups which are catalytically active but do not possess specific catalytic activity for the contact sulphuric acid process. Such catalysts or catalytic components which are not specific catalysts for the reaction in which they are being used under the reaction conditions obtaining will be referred to throughout the specification as stabilizer promoters, as they appear to enhance the toning effect which can be achieved by stabilizers. The use of this expression should, however, in no sense be taken to limit the invention to a particular theory of action of these non-specific catalysts and in fact in some cases stabilizer promoters may be present where there are no stabilizers.

It should be noted that when leaching is not carried beyond the stage of removing part or all of the exchangeable bases the catalytic components of the contact mass may be present in any of the above referred to forms. Where, however, leaching is carried out to completely remove both the exchangeable bases and all of the more basic portions of the non-exchangeable nucleus the catalytic components in the case of zeolites can only be present in the form of diluents, whereas in the case of non-silicious base exchange bodies in the remaining more acidic portion of the nucleus may or may not be a catalyst.

The base exchange bodies which form the important components or initial material for derivatives in contact masses of the present invention may be prepared by any of the well known methods. Thus for example, two-component zeolites may be prepared by wet methods, in which the metallate components or metal salt components, part or all of which may be catalytically active, are caused to react with soluble silicates to form zeolites of alumino-silicate or aluminum double silicate types, or the components may be fused, preferably in the presence of fluxes. It should be understood that under the term metallate is included not only the alkaline solutions of amphoteric metal oxides or hydroxides but also alkali forming metal salts of metal acids, such as the oxyacids of metals of the fifth and sixth groups, which in at least one state of oxidation are not strictly speaking amphoteric, but which products are capable of reacting with silicates to form zeolites, or with other components to form non-silicious base exchange bodies. Throughout the specification this somewhat more general definition of metallates will be strictly adhered to. In the formation of two-component zeolites by wet methods, the final reaction product must be alkaline to litmus, and for products of high base exchanging power it should be neutral or alkaline to phenolphthalein. For the purpose of producing base exchange bodies to be used in the preparation of contact masses of the present invention it is sometimes unnecessary to provide high base exchanging power, and for many purposes zeolites formed under conditions resulting in a final reaction which is acid to phenolphthalein but alkaline to litmus are of advantage. It is not definitely known whether products produced under such circumstances are homogeneous chemical compounds, although in many ways they behave as such. There is, however, reason to believe that in some cases at least mixtures of base exchanging and non-base exchanging polysilicates may be produced. For the purpose of the present specification a product will be considered as a base exchange product if it has any base exchange power at all.

It is desirable for many purposes and particularly where two component zeolites of high base exchanging power are needed to add the relatively acid components, for example, metal salts in the case of aluminum double silicate type of zeolites, to the relatively more alkaline components such as for example soluble silicates. By these means a continuous alkalinity is insured, and this method may be considered as the preferred method in most cases, but the opposite procedure is advantageous for certain contact masses and is included in the invention.

Multi-component zeolites may be prepared by any of the foregoing methods using at least three types of components, that is to say, at least one metallate, at least one metal salt and at least one soluble silicate. In the case of multi-component zeolites, as in the case of two-component zeolites, the conditions of alkalinity should be observed, and for many purposes it is advantageous to add the relatively acid components to the relatively alkaline components, in order to insure continuous alkaline reaction. The multi-component zeolites produced vary in their nature, dependent on the proportion of the different reacting components. Thus where the metallates and silicates predominate over the metal salts the resulting products resemble the alumino silicate type of two-component zeolites. If the metal salts and silicates predominate over the metallates the products resemble the aluminum double silicate type of two-component zeolites, and finally if the metallates and metal salts predominate over the silicates the resulting product resembles more or less non-silicious base exchange bodies. It will be clear that there is no sharp defining line between the three types of multi-component zeolites, and one shades into the other as the proportions of the different components vary. It is an advantage of the multi-component zeolites over the two-component zeolites that the choice of catalytically active components is wider, as some catalytically active elements or groups can only be incorporated in the form of metallates and others only in the form of metal salts. In a multi-component zeolite each catalytically active group can be incorporated in the form in which it is best available.

Non-silicious base exchange bodies are produced by the general methods described above, but instead of bringing about reactions between silicates and other metal oxide components, two or more oxymetal compounds are caused to react, in general, at least one will be a metallate and at least one a metal salt, or in some cases it is possible to bring about action between two different metallates in which one negative radical is more acidic than the other. It is possible to produce non-silicious base exchange bodies in which a plurality of metal oxides are present. It is also possible to produce non-silicious base exchange bodies in which a single metal is present. Thus for example, some metals may be sufficiently amphoteric in character to form both metallates and metal salts which are capable of reacting with each other to produce base exchange bodies.

A special method of producing non-silicious base exchange bodies consists in the gradual neutralization of strongly alkaline salts of the oxyacids of metal elements of the fifth and sixth groups in stages of oxidation in which they are sufficiently amphoteric. The neutralization of other strongly alkaline metallates may also bring about formation of non-silicious base exchange bodies. The converse method, whereby non-alkaline salts of suitable metals are gradually treated with alkali until the reaction is sufficiently alkaline to permit the formation of base exchange bodies, may also be used.

Many metals are capable of entering into the base exchange body formation only in certain stages of oxidation, and it is sometimes necessary to introduce such metals in a stage of oxidation different from that desired in the final base exchange body, the change of stage of oxidation being preferably effected during the formation of the base exchange body. Certain other elements may be incorporated in the form of complex compounds of the most various types, such as for example, ammonia complexes and the like.

In addition to the artificial base exchange bodies briefly described above, natural base exchange bodies, such as nepheline, leucite, felspar, and the like, may be used.

The most important contact masses for many reactions contain permutogenetic products, in which preferably the diluents are homogeneously incorporated into the base exchange bodies before formation of the latter, or at least before the base exchange body has set after formation. Many diluents, both insert, stabilizing, activating, catalytically active, or having stabilizer promoter effects, can be used. A few of the diluents will be briefly enumerated:—kieselguhrs of all kinds, particularly natural or treated "celite" earth, silicious powders of various types, powdered permutogenetic products, natural or artificial powders of rocks, stones, tuffs, trass, lava, and similarly volcanic products which are frequently highly porous, greensand, glauconite or its acid leached derivative glaucosil, pulverized slag wool, cements, sand, silica gel, pulverized earthenware, fuller's earth, talc, glass powder, pumice meal, meerschaum, magnesia, asbestos, graphite, activated carbon, quartz meal, various pulverized minerals rich in quartz, metal powders and metal alloy powders, or spongy metals, salts of oxymetal acids such as tungstates, vanadates, chromates, uranates, manganates, cerates, molybdates, etc., particularly salts of the above, silicates, such as copper silicate, iron silicate, nickel silicate, cobalt silicate, aluminum silicate, titanium silicate, minerals or ores, especially those rich in copper, etc. Finely divided diluents are of great advantage, especially when the average particle size is less than 60 microns, in which case the diluents possess high surface energy, which increases the adsorptive and absorptive capacity of the contact mass, the diffusion speed and porosity. These finely divided diluents may be considered as physical catalysts or activators. Diluted permutogenetic bodies may also be finely divided and used as part or all of the diluents of other base exchange bodies.

The following nine methods are the most effective for the introduction of diluents, but any other suitable methods can be used:

(1) The diluents may be mixed with one or more liquid components of the base exchange bodies to be formed when the latter are prepared by wet methods.

(2) Components, either catalytically active, stabilizer promoters, or others, may be precipitated or impregnated into diluent bodies which are then incorporated into the base exchange bodies by any suitable methods of incorporation.

(3) Diluents may be mixed with base exchange bodies when the latter are still in the form of gels, by kneading or stirring, in which case the base exchange gel behaves as an adhesive. The homogeneity and uniformity of the distribution of the diluents is of course not quite so great by this method as by method (1), but for the contact sulphuric acid process extreme uniformity is not essential.

(4) Diluents may be formed during the formation of base exchange bodies by mixing suitable compounds with the components of the base exchange bodies so that the diluent particles are precipitated during formation. Protective colloids may be added to prevent coagulation of the diluent particles before the base exchange bodies have become sufficiently set.

(5) Compounds may be added which react with certain of the base exchange bodies forming components to produce diluents, for instance salts of the metal acids of the fifth and sixth groups may be added in sufficient excess so that they react with components of the base exchange body to form insoluble diluents, as for example with heavy metal oxides.

(6) Preformed base exchange bodies, diluted or undiluted, artificial or natural, can be impregnated with true or colloidal solutions of catalytically effective components and then dried.

(7) A preformed base exchange body, diluted or undiluted, may be impregnated with a plurality of solutions which react therein to precipitate any desired diluents.

(8) Soluble diluent compounds may be added to the components forming a base exchange body, which after formation retains the compounds in solution and is dried without washing or is treated to precipitate the compounds.

(9) Natural base exchange bodies or artificial base exchange bodies, diluted or undiluted, or their derivatives, may be impregnated with solutions of the desired compounds, which are then precipitated by means of reactive gases.

The nucleus or non-exchangeable portion of the molecules of the base exchange bodies is ordinarily considered to consist of two types of oxides, namely, relatively basic metal oxides, usually amphoteric, and relatively acidic oxides, such as $SiO_2$, some amphoteric metal oxides and some metal oxides which have a distinctly acid character. The nucleus behaves as a single anion and cannot be split by ordinary chemical means, but it is advantageous to consider the two portions of the nucleus as the basic and acidic portions, bearing in mind of course that the nucleus behaves as a single group. The metal compounds which are capable of forming the basic portion of the nucleus are those of the following metals: copper, silver, gold, bismuth, beryllium, zinc, cadmium, boron, aluminum, some rare earths, titanium, zirconium, lead, thorium, niobium, antimony, tantalum, chromium, molybdenum, tungsten, uranium, vanadium, manganese, iron, nickel, cobalt, platinum, palladium. Compounds of these elements may be introduced singly or in mixtures, in any desired proportions, and may be in the form of simple or complex ions. It should be understood that some of the elements in certain stages of oxidation may be introduced either as metallates or metal salts. Others may be introduced in only one form, and still others may be introduced in a stage of oxidation other than that desired in the final base exchange body or in the form of complex compounds. Among the complex ionogens are ammonia, hydrocyanic acid, oxalic acid, formic acid, tartaric acid, citric acid, glycerine and the like.

Many of the metals are specific catalysts, others are stabilizers, and still others are stabilizer promoters.

Examples of components forming the relatively acid portion of the base exchange nucleus are alkali metal silicates, which are soluble in alkali, and alkali metal salts of acids, such as those of boron, nitrogen, titanium, vanadium, tungsten, chromium, niobium, tantalum, uranium, antimony, manganese, etc.

The exchangeable bases of the base exchange bodies may be substituted by base exchange, and the elements which can be introduced singly or in admixture by base exchange are the following:—copper, silver, gold, ammonium, beryllium, calcium, manganese, cæsium, potassium, sodium, zinc, strontium, cadmium, barium, lead, aluminum, scandium, titanium, zirconium, tin, antimony, thorium, vanadium, lithium, rubidium, thallium, bismuth, chromium, uranium, manganese, iron, cobalt, nickel, ruthenium, palladium, platinum and cerium.

The exchangeable bases introduced may be specific catalysts, they may be stabilizers, or they may be stabilizer promoters. They may be introduced as simple ions or as complex ions, and may enhance the catalytic activity of the final contact mass, improve its physical strength, or both.

As has been described above, base exchange bodies can be caused to react with compounds containing acidic radicals capable of forming therewith salt-like bodies. The radicals may be present in the form of simple acid radicals, polyacid radicals or complex acid radicals, and include radicals containing the following elements:—chromium, vanadium, tungsten, uranium, molybdenum, manganese, tantalum, niobium, antimony, bismuth, chlorine, platinum, boron. Among the complex radicals are ferro and ferricyanogen, certain ammonia complexes and the like. The amount of acid radicals caused to unite with the base exchange bodies to form salt-like bodies may be varied so that the resulting products may possess the character of acid, neutral or basic salts. Most of these acid radicals are stabilizers or stabilizer promoters for the catalytic contact sulphuric acid process.

It has been found that the most effective catalytic elements for the contact sulphuric acid process are vanadium and metals of the platinum group. Vanadium constitutes the preferred component since suitable permutogenetic contact masses containing it not only possess high activity, in many cases even surpassing that of the usual platinum contact masses, but they are substantially unaffected by the poisons which so rapidly destroy platinum contact masses; these poisons being, for example, metalloids such as arsenic, antimony, sulphur, selenium, tellurium and the like, acid mist, halogens, etc. It is, however, possible to prepare platinum catalysts containing leached permutogenetic bodies, and while these contact masses do not possess the advantage of being capable of use with gases containing poisons for platinum contact masses they are nevertheless included in the present invention, and are highly effective contact masses of the platinum type.

The leaching of the permutogenetic bodies may be carried out by means of dilute mineral acids such as 1 to 2% sulphuric, hydrochloric or nitric acid, alkali metal acid sulphates, etc. The extent to which the leaching should be carried out will of course vary with different contact masses, and the present invention includes contact masses with any degree of leaching.

Permutogenetic bodies, before or after leaching, diluted or undiluted, may be coated in the form of films on massive carrier granules of natural or artificial nature, such as quartz, rocks rich in silica, metal alloys such as ferro-vanadium, ferro-tungsten, ferro-chromium, ferro-manganese and the like, zeolites, natural or artificial, artificial carrier bodies prepared by forming granules of kieselguhr and waterglass or other adhesives, etc. It is frequently desirable to etch or roughen the surface of granules, and in the case of quartz or minerals rich in silica they may be boiled with caustic alkalis in order to roughen the surface and to form a thin film of waterglass thereon which improves the adhesiveness. In some cases where the leached permutogenetic body may lack mechanical strength it is desirable to form it into pellets with suitable adhesives, such as potassium bisulfate, waterglass, gypsum and the like. It is also desirable in many cases to subject the contact masses to a preliminary treatment at elevated temperatures with air or acid gases, such as halogen, $SO_3$, $SO_2$ and air, oxides of nitrogen and the like.

The invention will be described in greater detail in connection with the following specific examples which illustrate typical embodiments thereof; but it should be understood that the invention is not limited in its scope to the exact details therein set forth.

*Example 1*

2.2 parts of ammonium vanadate are mixed with a solution containing .77 parts of NaOH in 25 parts of water and the mixture is boiled until the odor of ammonia is no longer perceptible. About 65 parts of water are then added to the solution together with 9.7 parts of waterglass of 38° Bé. and an equal amount of water, stirring being continuously maintained. The reaction mixture is then gradually warmed up to about 65° C. with vigorous agitation and dilute hydrochloric acid is added in small portions from time to time until both the reaction product and mother liquor are still alkaline to litmus. The gel-like precipitate is separated from the solution and after drying at temperatures below 100° C. a colorless mass is obtained which is then hydrated with water.

Instead of using the undiluted vanadium zeolite it may be diluted with acid resistance fillers, such as finely powdered sand, rocks rich in quartz, "celite" earth, colloidal $SiO_2$ and the like. The diluents may be embedded in situ during the manufacture of the zeolite or may be incorporated after the zeolite has been made by kneading into the moist curdy precipitate and then hydrating with water. The pentavalent vanadium can be substituted partly or wholly by trivalent or tetravalent vanadium.

Similarly, two-component zeolites may be prepared by causing a corresponding vanadyl sulfate solution to react with the waterglass, care being taken that the reaction product is alkaline to litmus and preferably neutral to phenolphthalein. Three component zeolites may also be prepared by causing sodium vanadite and vanadyl sulfate to react with the waterglass which may be effected by mixing the vanadite solution with the waterglass and then adding the vanadyl sulfate solution with vigorous agitation until the reaction product, which comes down in the form of a gel-like precipitate, is alkaline to litmus or preferably alkaline or neutral to phenolphthalein.

The hydrated zeolite is leached by trickling dilute organic or inorganic acids over it for a sufficient period of time to remove part or all of the exchangeable alkali present. The leached bodies are filled into a converter and burner gases containing 7–8% $SO_2$ are passed over the contact mass at 400–450° C. High conversion of $SO_2$ to $SO_3$ is obtained and when the temperature conditions are chosen so that in the portion of the catalyst last encountered by the gases the temperature is low enough for best equilibrium, around 400°, the yields in some cases are as high as 98% of the theory.

Instead of using the leached base exchange bodies, diluted or undiluted, as contact mass fragments, they may be finely ground and coated onto natural or artificial granules such as fragments of diatomaceous earth, filter stones, roughened quartz, acid resistant minerals, rocks, etc. Waterglass, caustic alkalies or alkali metal salts may be used as cementing agents. Diluted base exchange bodies may also be mixed with caustic alkali or alkali metal salt solutions in order to give them the necessary mechanical strength when formed in fragments of the proper shape.

Instead of leaching the hydrated zeolites immediately, they may first be treated to effect base exchange, for example by permitting a 5–10% solution of copper sulfate to trickle over the base exchange body until a maximum of exchangeable alkali base has been substituted. The cuprovanadium zeolite thus produced is leached with dilute acids, such as 2–3% sulphuric acid, hydrochloric acid or 10–15% acetic acid. The leaching may advantageously be effected by placing the material to be leached on a common filter and trickling the acid solutions over it for ½ to 2 hours depending on the amount of leaching desired. This method may be applied to the zeolites described in the first paragraphs of this example.

Other derivatives may be prepared by forming the so-called salt like bodies of the zeolites before leaching thus, for example, the cuprovanadium zeolite described in the foregoing paragraph can be caused to react with compounds containing the acid radicals of the metal acids of the fifth and sixth group of the periodic system, thus, for example, a 1% ammonium vanadate solution or a 5–10% potassium vanadate solution or the corresponding ammonium tungstate solution may be used. After the salt like body is formed, leaching is effected as described above. Of course instead of using copper sulfate to produce the cuprovanadium zeolite, other metal salts may be used, singly or in admixture, such as those of iron, nickel, cobalt, silver, calcium, aluminum, etc.

*Example 2*

12 parts of $V_2O_5$ are dissolved in 200–250 parts of water containing 12.4 parts of 90% KOH and 80 parts of "celite" brick refuse are stirred in. The suspension is then treated with 7–12 parts of ferric chloride dissolved in 150–200 parts of water, the temperature being maintained at 40–50° C. After all of the ferric chloride has been added the reaction mixture is neutralized to litmus if necessary by the gradual addition of 2 N. sulphuric acid. "Celite" brick refuse impregnated with iron vanadate is obtained and can be separated from the mother liquor by filtration whereupon it is washed with 200 parts of cold water.

90.5 parts of 33° Bé. waterglass are diluted with 4–5 volumes of water and the iron vanadate-"celite" brick filter cake obtained above is vigorously stirred in so as to effect a fairly uniform distribution. 60 parts of aluminum sulfate with 80 mols of water are dissolved in 200 parts of water and sufficient 2 N. potassium hydroxide is added to dissolve up the aluminum hydroxide which is at first precipitated forming a potassium-aluminate solution which is then stirred into the waterglass suspension and the mixture heated to 60–70° C. A gelatinous precipitate is obtained which is increased by the gradual addition of 2 N. sulphuric acid. Care should be taken that a weak alkalinity to phenolphthalein is maintained. The stirring is continued for about an hour, the mixture being gradually permitted to cool down to room temperature. The gelatinous precipitate obtained is pressed and washed with 200 parts of water in small portions and constitutes a yellow filter cake which is dried at 80° C. and broken into fragments of suitable size.

The iron vanadate may be substituted partly or wholly by other catalytic compounds of vanadium, such as vanadyl silicate, the vanadates of cobalt, nickel, silver, aluminum, manganese or copper, and silicates of iron, aluminum, cobalt, nickel or copper may also be embedded if desired. Other catalytically active diluents are those containing tetravalent vanadium, such as the vanadites of nickel, cobalt, manganese, copper, aluminum, silver, titanium or calcium. The zeolites obtained after hydrating with water may, if desired be digested with 5–10% solutions of salts of iron, copper, nickel, calcium, etc. in order to effect base exchange and if desired salt like bodies may be prepared with metal acids of the fifth and sixth group of the periodic system as described in Example 1.

The zeolites or derivatives of the zeolites obtained above are leached with dilute organic or inorganic acids, such as 2–3% hydrochloric acid or 8–10% acetic acid for a longer or shorter time.

2–4 volumes of the contact mass obtained are placed in a converter and 1,000–2,000 volumes per hour of 7–9% burner gases are passed over the contact mass at temperatures of about 380–450° C. The yield in many cases is from 96–98.1% of the theory when the exotherm is satisfactorily controlled. The contact masses are very resistant to high temperatures.

Preferably the contact masses may be formed into suitable granules using a sufficient amount of about 10% potassium waterglass as an adhesive. They may also be coated onto natural or artificial carrier fragments, such as, for example, ilmenite, bauxite, minerals rich in silicia, such as roughened quartz fragments, quartz filter stone fragments, "celite" bricks, metals and metal alloys such as roughened fragments of ferrovanadium, ferrosilicon, silicon-ferromanganese, silicon-aluminum - ferromanganese, ferrotitanium, ferrotungsten, and the like. The coating may be effected by heating the massive carrier fragments to 100–120° C. with agitation and spraying the suspension of the leached base exchange bodies onto them with the help of a separate cementing agent, such as potassium waterglass, in order to produce a firmly adherent film on the carrier fragments. The aluminate solution may be substituted by one or more other metallate solutions, such as potassium vanadate, potassium tungstate, potassium vanadite, potassium chromite, etc.

Metallate solutions may also be replaced partly or entirely by metal salt solutions which are capable of reacting with the waterglass under suitable reaction conditions to give base exchange bodies, such as, for example, solutions of salts of iron, zirconium, titanium, cadmium, copper, chromium, pentavalent or tetravalent vanadium, etc. Instead of using artificial zeolites in some cases, natural zeolites may be used as starting materials for producing the leached out contact masses.

Example 3

15 parts of $V_2O_5$ are dissolved in a ½ N. KOH solution to form potassium metavanadate. Freshly precipitated aluminum hydroxide containing 5 parts of $Al_2O_3$ is dissolved in 35–45 parts of 100% KOH in 250 parts of water forming a potassium-aluminate solution. The two solutions are poured together and a mixture of 20 parts of $TiO_2$ and 50 parts of "celite" earth are stirred in. Thereupon a solution containing 17 parts of aluminum sulfate with 18 mols of water mixed with 20 parts of ferric sulfate with 9 mols of water in 300 parts of water is gradually poured into the aluminate-vanadate solution at temperatures of about 50–70° C. With the help of 5% sulphuric acid the desired acidity, neutrality, or alkalinity to phenolphthalein can be obtained. A reaction product is formed which constitutes a vanadium-aluminum-iron base exchange body containing titanium oxide and "celite" earth as a diluent. The product is freed from the mother liquor in the usual manner, washed with 3–4 times its weight of water and dried at temperatures preferably below 100° C. The non-silicious base exchange body is then put on a Nutsch filter and carefully leached with 2–5% hydrochloric acid or sulphuric acid, the leaching procedure being carried out by means of 250–500 parts of such dilute acids which are gradually trickled over the base exchange body. Instead of leaching the base exchanged body after formation it may first be subjected to base exchange and then salt like bodies formed as described in Example 1. These products are then leached and the final product obtained preferably kneaded with 15–20% of its weight of 33° Bé. waterglass, being then formed into suitable pieces for use as a contact mass. The contact mass is calcined with air at about 400° C. and is then subjected to a preliminary treatment with 3–5% burner gases at 450° C. Thereafter the contact mass is ready for use and when 7–9% burner gases are passed over it at 420–450° C. a high conversion of $SO_2$ to $SO_3$ is obtained and at the same time the contact mass shows a good resistance to high temperatures.

The potassium vanadate used in this example may be replaced by potassium vanadite or other components such as those described in other examples. Part of the components may be in the form of complex compounds, such as cuprammonium compounds, complex iron compounds and the like.

Example 4

Three mixtures are prepared as follows:

(1) 210 parts of 33° Bé. potassium waterglass solution diluted with 6–8 volumes of water are mixed with "celite" earth and glaucosil (the acid leached residue of greensand) until the suspension just remains easily stirrable. The mixed diluent preferably contains more than 30% of "celite" and the amount of diluent added may be varied within wide limits.

(2) 2 parts of $V_2O_5$ are reduced to a blue vanadyl sulfate solution by means of sulphur dioxide in a hot aqueous solution acidified with sulphuric acid. The vanadyl sulfate obtained is then transformed into a brown solution of potassium vanadite by using sufficient 10 N. caustic potash solution.

(3) A 10% aluminum sulfate solution is prepared.

Suspension (1) and solution (2) are poured together and sufficient aluminum sulfate solution is added in a thin stream with vigorous agitation so that the reaction mixture is rendered neutral to phenolphthalein or just alkaline. The mass solidifies to a dirty green gel which is filtered by suction, slightly washed and dried and is a diluted three-component base exchange body containing tetravalent vanadium, aluminum and $SiO_2$ in non-exchangeable form.

Part or all of the solution (2) may be replaced by a potassium vanadate solution prepared by dissolving the $V_2O_5$ in 2 N. potassium hydroxide solution. Other metallates and metal salt solutions may also be used and the catalytically effective material, especially the vanadium compounds, may be introduced in non-exchangeable form, in exchangeable form, or as an acid component when a salt like body is prepared, and finally as a diluent in three component zeolites and their derivatives as has been described in the foregoing examples. The compositions described above are hydrated with water and then given a short preliminary leaching with 2–4% hydrochloric acid. The contact mass obtained is filled into a converter and 6–9% burner gases are passed over it at the usual reaction temperatures. When the conditions are properly adjusted for the equilibrium of the reaction and the exotherm is uniformly and adequately taken care of, preferably in converters provided with automatic heat exchange, conversions from 97–98.2% of the theory are obtained.

Example 5

Natural or artificial base exchange bodies, diluted or undiluted, which may be prepared either by wet or fusion processes, are leached with dilute acid, such as 2–3% hydrochloric acid, and are then coated or impregnated with catalytically active compounds. For example, 200 parts of such a leached base exchange body are heated and impregnated with a 1% solution containing 8–12 parts by weight of ammonium vanadate or a corresponding amount of suspended silver or iron vanadate or a 5% platinum chloride solution. The products are first heated up to 400° C. before use in the contact sulphuric acid process in which they give good conversions with 7–9% burner gases under the usual reaction temperatures. Instead of using suspensions of vanadium salts, they may be formed in situ on the surface of the leached base exchange body by causing the necessary components to react.

It should be understood that when a platinum contact mass is prepared as described in this example it cannot be used without purifying the gases from such poisons for platinum as arsenic, metalloids, chlorine, and the like. The vanadium contact masses described in the examples may be used with gases containing gaseous poisons for platinum and this constitutes an advantage of the vanadium contact masses and other non-platinum contact masses of the present invention.

What is claimed as new is:

1. A method of catalytically oxidizing sulphur dioxide to sulphur trioxide, which comprises passing sulphur dioxide admixed with an oxygen containing gas at an elevated temperature over a contact mass which contains at least one acid leached permutogenetic body.

2. A method of catalytically oxidizing sulphur dioxide to sulphur trioxide, which comprises passing sulphur dioxide admixed with an oxygen containing gas at an elevated temperature over a contact mass which contains at least one acid leached permutogenetic body, at least one catalytically effective component being chemically combined in or with the permutogenetic body.

3. A method of catalytically oxidizing sulphur dioxide to sulphur trioxide, which comprises passing sulphur dioxide admixed with an oxygen containing gas at an elevated temperature over a contact mass which contains at least one acid leached permutogenetic body, at least one catalytically effective component being chemically combined in or with the permutogenetic body in non-exchangeable form.

4. A method of catalytically oxidizing sulphur dioxide to sulphur trioxide, which comprises passing sulphur dioxide admixed with an oxygen containing gas at an elevated temperature over a contact mass which contains at least one acid leached diluted permutogenetic body.

5. A method of catalytically oxidizing sulphur dioxide to sulphur trioxide, which comprises passing sulphur dioxide admixed with an oxygen containing gas at an elevated temperature over a contact mass which contains at least one acid leached diluted permutogenetic body, at least one diluent being catalytically active.

6. A method of catalytically oxidizing sulphur dioxide to sulphur trioxide, which comprises passing sulphur dioxide admixed with an oxygen containing gas at an elevated temperature over a contact mass which contains at least one acid leached permutogenetic body, the contact mass being free from elements of the platinum group.

7. A method of catalytically oxidizing sulphur dioxide to sulphur trioxide, which comprises passing sulphur dioxide admixed with an oxygen containing gas at an elevated temperature over a contact mass which contains at least one acid leached permutogenetic body, the contact mass containing vanadium as at least one of its effective catalytic components.

8. A method of catalytically oxidizing sulphur dioxide to sulphur trioxide, which comprises passing sulphur dioxide admixed with an oxygen containing gas at an elevated temperature over a contact mass which contains at least one acid leached permutogenetic body, the contact mass containing vanadium chemically combined in or with the permutogenetic body.

9. A method of catalytically oxidizing sulphur dioxide to sulphur trioxide, which comprises passing sulphur dioxide admixed with an oxygen containing gas at an elevated temperature over a contact mass which contains at least one acid leached permutogenetic body, the contact mass containing vanadium chemically combined in or with the permutogenetic body in non-exchangeable form.

10. A method of catalytically oxidizing sulphur dioxide to sulphur trioxide, which comprises passing a gaseous mixture containing sulphur dioxide and oxygen and containing at least one gaseous poison for platinum contact masses, but free from mechanically entrained dust, at an elevated temperature over a contact mass containing at least one acid leached permutogenetic body, the contact mass being free from elements of the platinum group.

11. A method of catalytically oxidizing sulphur dioxide to sulphur trioxide, which comprises passing a gaseous mixture containing sulphur dioxide and oxygen, and containing at least one gaseous poison for platinum contact masses, but free from mechanically entrained dust, at an elevated temperature over a contact mass containing at least one acid leached permutogenetic body, the contact mass being free from elements of the platinum group and containing vanadium as at least one of its catalytically effective components.

12. A method of catalytically oxidizing sulphur dioxide to sulphur trioxide, which comprises passing a gaseous mixture containing sulphur dioxide and oxygen, and containing at least one gaseous poison for platinum contact masses, but free from mechanically entrained dust, at an elevated temperature over a contact mass containing at least one acid leached permutogenetic body, the contact mass being free from elements of the platinum group, and containing vanadium as at least one of its catalytically effective components, the vanadium being chemically combined in or with the permutogenetic body.

13. A method of catalytically oxidizing sulphur dioxide to sulphur trioxide, which comprises passing a gaseous mixture containing sulphur dioxide and oxygen, and containing at least one gaseous poison for platinum contact masses, but free from mechanically entrained dust, at an elevated temperature over a contact mass containing at least one acid leached permutogenetic body, the contact mass being free from elements of the platinum group and containing vanadium as at least one of its catalytically effective components, the vanadium being chemically combined in or with the permutogenetic body in nonexchangeable form.

14. A method of catalytically oxidizing sulphur dioxide to sulphur trioxide, which comprises passing a gaseous mixture containing sulphur dioxide and oxygen and containing at least one gaseous poison for platinum contact masses, but free from mechanically entrained dust, at an elevated temperature over a contact mass containing at least one acid leached diluted permutogenetic body, the contact mass being free from elements of the platinum group.

15. A method of catalytically oxidizing sulphur dioxide to sulphur trioxide, which comprises passing a gaseous mixture containing sulphur dioxide and oxygen, and containing at least one gaseous poison for platinum contact masses, but free from mechanically entrained dust, at an elevated temperature over a contact mass containing at least one acid leached diluted permutogenetic body, the contact mass being free from elements of the platinum group and containing vanadium as at least one of its catalytically effective components.

16. A method of catalytically oxidizing sulphur dioxide to sulphur trioxide, which comprises passing a gaseous mixture containing sulphur dioxide and oxygen, and containing at least one gaseous poison for platinum contact masses, but free from mechanically entrained dust, at an elevated temperature over a contact mass containing at least one acid leached diluted permutogenetic body, the contact mass being free from elements of the platinum group and containing vanadium as at least one of its catalytically effective components, the vanadium being chemically combined in or with the permutogenetic body.

17. A method of catalytically oxidizing sulphur dioxide to sulphur trioxide, which comprises passing a gaseous mixture containing sulphur dioxide and oxygen, and containing at least one gaseous poison for platinum contact masses, but free from mechanically entrained dust, at an elevated temperature over a contact mass containing at least one acid leached diluted permutogenetic body, the contact mass being free from elements of the platinum group and containing vanadium as at least one of its catalytically effective components, the vanadium being chemically combined in or with the permutogenetic body in non-exchangeable form.

Signed at Pittsburgh, Pa., this 2nd day of June, 1928.

ALPHONS O. JAEGER.